May 12, 1970   L. G. SIMJIAN   3,511,665
DISPENSING METHOD FOR FOOD
Filed Aug. 21, 1967   2 Sheets-Sheet 1
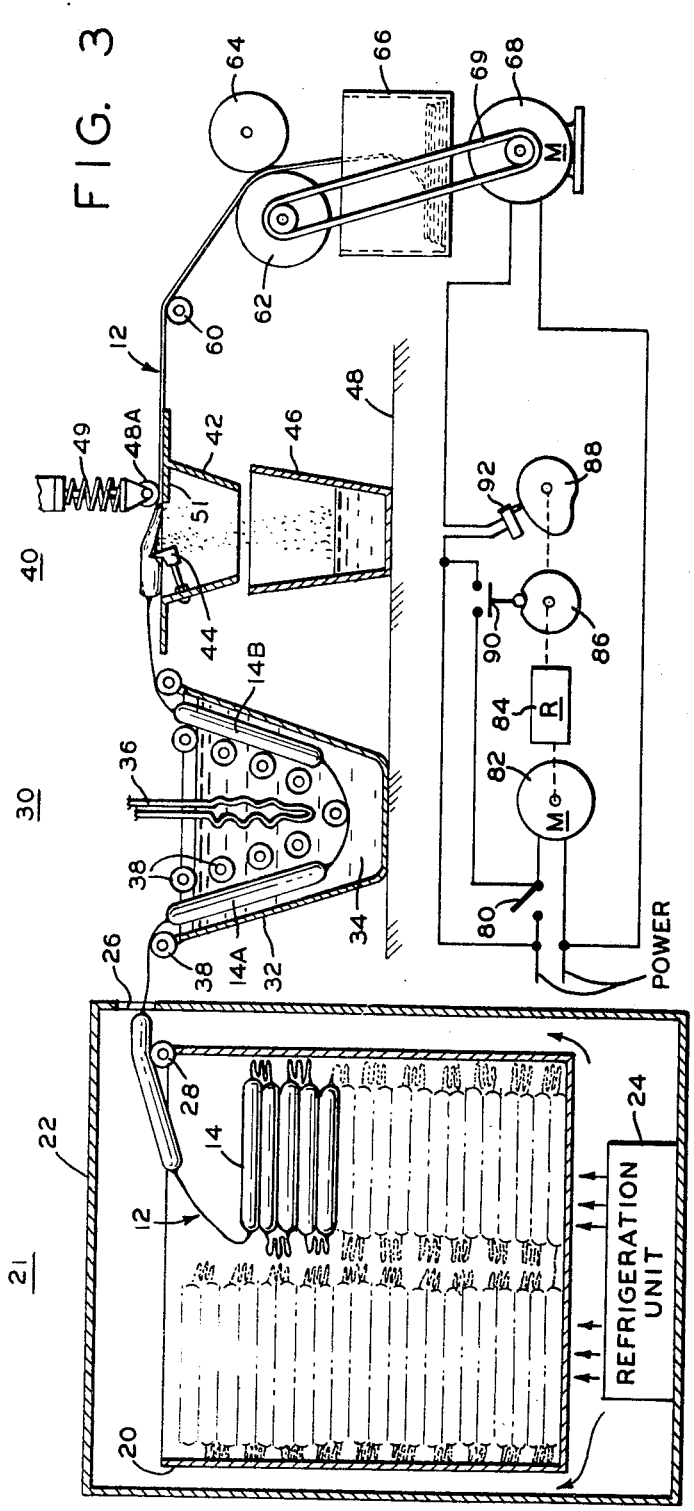
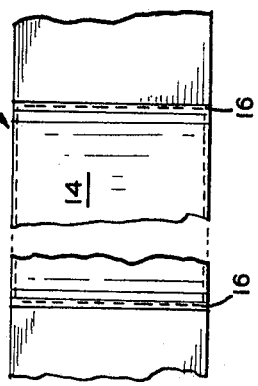
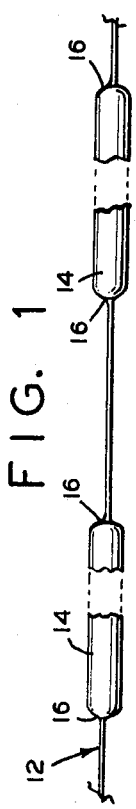
INVENTOR.
LUTHER G. SIMJIAN May 12, 1970            L. G. SIMJIAN            3,511,665

DISPENSING METHOD FOR FOOD

Filed Aug. 21, 1967            2 Sheets-Sheet 2

INVENTOR.
LUTHER G. SIMJIAN
BY
AGENT.

United States Patent Office
3,511,665
Patented May 12, 1970

3,511,665
DISPENSING METHOD FOR FOOD
Luther G. Simjian, Greenwich, Conn., assignor to General Research, Inc., Greenwich, Conn., a corporation of Connecticut
Continuation-in-part of application Ser. No. 462,612, June 9, 1965. This application Aug. 21, 1967, Ser. No. 662,066
Int. Cl. B67b 7/28
U.S. Cl. 99—1    9 Claims

ABSTRACT OF THE DISCLOSURE

Food to be dispensed for consumption is stored in a flexible plastic tubing divided into spaced and sealed compartments. The material forming the tubing and compartments is amenable to cutting by a cutter for creating an opening for discharging the food. As required for automated dispensing, the tubing is stored for preserving the food, incrementally advanced for conditioning (heating) the food in a compartment and then the compartment is advanced further and brought into contact with a cutter which opens the compartment to obtain discharge of the conditioned food.

---

This patent application is a continuation-in-part of my copending application for Letters Patent Ser. No. 462,612, filed on June 9, 1965, now U.S. Pat. No. 3,340,789, dated Sept. 12, 1967, entitled "Dispensing Machine."

This invention refers to a means for dispensing articles and concerns a machine which is adapted to dispense a substance which is conditioned prior to dispensing. More particularly, this invention pertains to a machine for dispensing a substance, specifically food, which requires protection and preservation during storage, requires conditioning prior to consumption and wherein such conditioning is accomplished by the machine immediately preceding the dispensing operation in order to dispense ready-to-eat food.

While the above recitation broadly identifies the general field of invention, the instant machine, when used with food packaged in a specific manner, is particularly suited for dispensing meals which include such items as heated soups, mashed potatoes, cut vegetables, hash type meats and other fluent substances of food. To this end, the machine is provided with means for receiving and storing a compartmentized band or tubing, each compartment having therein an article of food, means for advancing the tubing and the associated compartments successively to a conditioning station and from there to an article removing station at which the individual compartments are opened and the article or substance is removed for dispensing into a suitable container.

One of the principal objects of this invention is, therefore, the provision of a novel dispensing machine for food.

Another object of this invention is the provision of a dispensing machine adapted to receive food which is packaged in a specific manner, to condition the food for consumption and then to dispense the prepared food.

Still another object of this invention is the provision of a machine for dispensing meals, thereby being particularly suited for cafeterias, lunch rooms and other places involving large-scale mass feeding.

Figure 4:
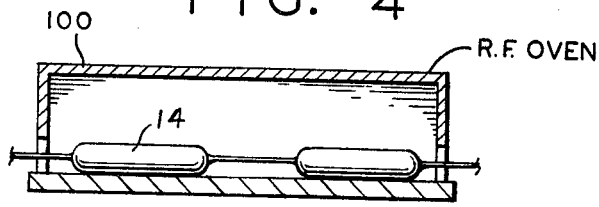
Figure 5:
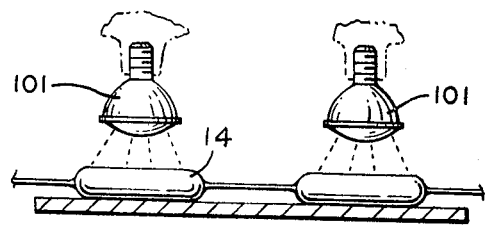
Figure 6:
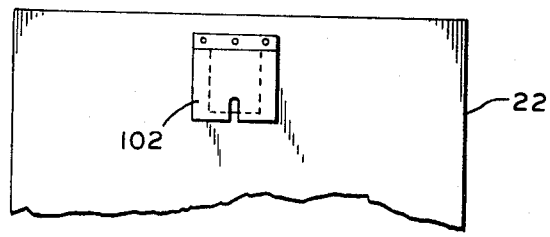
Figure 7:
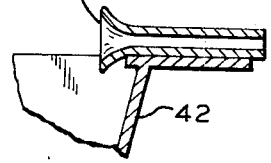

Further and still other objects of this invention will be apparent by reference to the following description when taken in conjunction with the accompanying drawings in which:

FIG. 1 is a side view of the means for retaining the article or substance to be dispensed;
FIG. 2 is a top plan view of FIG. 1;
FIG. 3 is a view of the general arrangement of the dispensing machine;
FIG. 4 is a view of an alternative heating means;
FIG. 5 is a view of another alternative heating means;
FIG. 6 is a view of a modification of the storage enclosure of FIG. 3;
FIG. 7 is a view of an alternative pressure means.

Referring now to the figures and FIGS. 1 and 2 in particular, there is shown a compartmentized tubing 12 which comprises, in the preferred example, a flexible plastic tubing 12, such as polyethylene. The tubing 12 contains a series of spaced apart elongated compartments or pockets 14, each being sealed at the area indicated by numeral 16. The compartments are spaced at equal distances and each compartment is filled with a suitable substance, such as food, e.g. soup, mashed potatoes, peas, meat, etc. By virtue of the seal 16 at either side, each compartment is completely sealed and the food disposed therein is protected and preserved.

An alternative construction comprises a flat, flexible band having individual sealed pockets with food contained therein attached to the belt. The attaching may be accomplished by ultrasonic sealing or heat sealing methods.

Irrespective whether the food containing pockets or compartments are an integral part of the tubing or attached to a supporting band, it shall be understood that there may be 50 or 100 or more such compartments serially arranged with respect to one another so that the food is packaged in discrete portions.

Referring now to FIG. 3, a compartmentized and filled tubing 12 having a plurality of compartments is shown fan-folded in a storage receptacle 20 which is housed in a larger storage enclosure 22 of the machine. The enclosure 22 may be considered the storage station 21 of the dispensing machine. A refrigeration unit 24 is provided to maintain the food within the individual compartments 14 refrigerated. The storage enclosure includes an aperture 26 by which the food carrying compartments leave the refrigerated storage area.

Numeral 30 refers to a conditioning station which serves to condition the food in the compartments after leaving the storage station. In the preferred arrangement, this conditioning station includes a trough-shaped container 32 filled with water 34 which is heated by an electric heating element 36. It should be noted that instead of a heated bath for conditioning the food within a pocket, a commercially available radio frequency or dielectric heating means 100, FIG. 4, may be used for heating the food without deviating from the principle of conditioning the food for consumption while the food is still fully enclosed and sealed in a respective compartment 14. Alternatively, heat lamp means 101, FIG. 5, may be used for supplying the heat.

As shown in FIG. 3, the container 32 is shaped to accommodate simultaneously two compartments 14A and 14B, but it will be apparent that the container 32 may be enlarged to concurrently accommodate a larger quantity of such compartments which are conditioned and/or maintained in a conditioned state. A roller 28 serves to guide the tubing 12 and associated compartments 14 out of the storage station, and a plurality of rollers 38 guides the tubing and associated compartments through the conditioning station 30.

From the conditioning station 30, the compartments are advanced to the article removing station 40 which comprises a funnel-shaped structure 42 and a knife edge 44 positioned to engage the compartment disposed at that station. The knife edge opens the respective compartment and thereby frees the substance or article from the compartment as the compartment moves over the knife edge. A receptacle, such as a cup 46, is disposed on a supporting surface 48 and receives the prepared substance, for instance, hot soup, as illustrated. A pressure roller 48A biased by a spring 49 and pressing against a ledge 51 squeezes any remaining material from each pocket or compartment. A sensing switch (not shown) may be provided to prevent the dispensing of food in the absence of a receptacle on the surface 48. Instead of a pressure roller 48A, a stationary flared and flattened tubing 103, FIG. 7, may be used through which the tubing is drawn.

The empty tubing or band is then fed about a roller 60 and between a set of guide rollers 62, 64 to a waste receptacle 66 which is emptied periodically or completely replaced. The empty portion of the tubing is cut off during this servicing operation. A motor 68 drives via an endless belt 69 the roller 62 in order to advance a respective compartment 14 from the storage station 21 to the conditioning station 30 and from the conditioning station to the article or substance removing station 40.

Operation of the present dispensing machine may be visualized as follows: Switch 80 can be actuated manually, but preferably is a coin actuated switch, such as is well known in the vending industry. Upon the momentary closing of the switch 80, motor 82 is energized which drives a reduction gear box 84 and two control circuit cams 86 and 88. Rotation of the cam 86 closes a holding switch 90 to bypass switch 80 and thereby keep the motor 82 running for one complete cycle. As the motor 82 rotates, the cam 88 rotates and during its rotation closes switch 92 which causes operation of the motor 68 for a predetermined period of the cycle. Operation of the motor 68 advances the tubing 12, causing a compartment 14 to be moved from the refrigerated area of the storage station to the conditioning station and another compartment to be advanced from the conditioning station to the article removing station. At the same time, a corresponding emtpy tubing portion reaches the receptacle 66.

It will be apparent that the compartments 14 must be spaced equidistant from one another as must be the spaces between the stations. Also, the compartments and the spacing therebetween must be related to the dimensions of the machine stations in order that the band moves by the appropriate distance during each cycle.

While the knife 44 is shown as being mounted stationary, it will be apparent that a movable slitting device may be employed which temporarily is brought into engagement with the respective compartment at the station 40 in order to open the compartment and to free the substance confined therein.

Several further modifications of this basic arrangement are comprehended by this design. As illustrated, the band or tubing 12 is designed with spaced compartments 14, each having the same article of food, such as the soup illustrated. In an alternative arrangement, the compartments may be arranged in sets of three for example. The first compartment could contain mashed potatoes, a second compartment peas and a third compartment meat. Each closing of the switch 80 then would cause three consecutive advances of the band, thus causing three compartments to be opened. By placing a plate on the supporting surface 48 and rotating the plate responsive to the advance of the band, an entire meal can be dispensed. In this alternative construction, the conditioning station is enlarged to condition simultaneously a plurality of such sets of compartments.

A further alternative construction permitting the dispensing of a meal comprises the paralling of bands, each band having a particular food. By paralleling three or four bands, a corresponding number of different foods can be dispensed simultaneously. The storage station, conditioning station and article removing station are then enlarged to accommodate several bands disposed in parallel.

The material used for the compartments must be capable of withstanding heat, be flexible, and not affect the taste of the food. Plastic materials of this type are readily available and polyethylene, previously indicated, is only one of several choices.

As a further variation, the conditioning station may be equipped with flash freezing means in order to provide frozen ice cream for dispensing, the mixture being stored refrigerated but not frozen in the enclosure 22.

In order to prevent the loss of cool air from the enclosure 22, the aperture 26 may be provided with a movable closure. In its simplest arrangement, a weighted canvas or a rubber flap 102, FIG. 6, can be mounted to the top of the aperture, the flap yielding upon being pushed by the pockets 14. Alternatively, a hinged door may be provided which moves in a similar manner. A still further construction comprises a vertically sliding shutter biased by a resilient spring and moved responsive to the motion of a pocket or moved by means of a solenoid which is controlled by a suitable control means, such as a switch and cam, a sensing switch, or a photoelectric means.

The arrangement described heretofore overcomes the problem of storing and opening metal cans, emptying the food from metal containers and subsequently disposing the bulky, empty cans, problems heretofore never successfully solved in automated food dispensing machines. The inherent simplicity and benefits of the design disclosed heretofore will readily be apparent to those concerned with automated cafeteria arrangements.

What is claimed is:

1. A method of preparing food for dispensing and consumption comprising the steps of:
   providing the food in a continuous tubing having spaced and sealed flexible plastic compartments made of material amenable to cutting by a cutter for the purpose of creating an opening for discharge of the food from the opened compartment;
   storing said tubing and its compartments under conditions which preserve the food;
   advancing incrementally a portion of the tubing with at least one compartment to a conditioning station while such compartment is still a part of the tubing and conditioning the food sealed in the respective compartment;
   advancing the tubing and compartment after conditioning the food therein to an opening station and providing engagement between the compartment and a cutting means for causing an opening in the compartment through which the conditioned food discharges from the compartment, and
   collecting the discharged food.

2. A method of preparing food for dispensing as set forth in claim 1 and including the step of squeezing the opened compartment of the tubing for assisting the discharging of the food from the respective compartment.

3. A method of preparing food for dispensing as set forth in claim 2, said squeezing being carried out while the tubing is advanced away from the opening station.

4. A method of preparing food for dispensing as set forth in claim 1 and including the step of collecting the tubing with emptied compartments in a waste receptacle.

5. A method of preparing food for dispensing as set forth in claim 1, said conditioning comprising heating the food.

6. A method of preparing food for dispensing and consumption comprising the steps of:
   providing the food in flexible plastic compartments made of material amenable to cutting by a cutter for the purpose of creating an opening for discharge of the food from the opened compartment, and attaching the compartments to portions of a transport belt which is adapted to support said compartments as said compartments are advanced along a travel path;
   storing said belt and compartments under conditions which preserve the food;
   advancing incrementally a portion of the belt with at least one compartment to a conditioning station while such compartment is still closed and conditioning the food confined therein;
   advancing the belt and the respective compartment after conditioning the food therein to an opening station and providing engagement between the compartment and a cutting means for causing an opening in the compartment through which the conditioned food discharges from the compartment;

collecting the discharged food, and squeezing the walls of the opened compartment for assisting the discharging of the food from the opened compartment.

7. A method of preparing food for dispensing as set forth in claim 6, said squeezing being carried out while the belt and compartment are advanced away from said opening station.

8. A method of preparing food for dispensing as set forth in claim 7 and including the step of collecting the belt with emptied compartment in a waste receptacle.

9. A method of preparing food for dispensing as set forth in claim 6, said conditioning comprising heating the food.

References Cited

UNITED STATES PATENTS

| 1,825,528 | 9/1931 | Knusden | 99—109 |
| 3,117,511 | 1/1964 | Everett | 99—357 |
| 3,139,343 | 6/1964 | Baselt | 99—71 |
| 3,162,539 | 12/1964 | Repko. | |
| 3,224,361 | 12/1965 | Ojelid | 99—357 X |

FOREIGN PATENTS 924,516  4/1963  Great Britain.

FRANK W. LUTTER, Primary Examiner

U.S. Cl. X.R.

99—171. 352: 222—82. 94. 146